United States Patent Office 3,741,963
Patented June 26, 1973

3,741,963
WATER SOLUBLE N-CARBOXY DERIVATIVES OF CEPHRADINE AND CEPHALEXIN AND A METHOD FOR THEIR PREPARATION
Friedrich Dursch, Hopewell, N.J., and Octavian Kocy, Bronx, N.Y., assignors to E. R. Squibb & Sons, Inc., Princeton, N.J.
No Drawing. Filed July 28, 1971, Ser. No. 166,979
Int. Cl. C07d 99/24
U.S. Cl. 260—243 C  4 Claims

ABSTRACT OF THE DISCLOSURE

N-carboxy derivatives of cephradine and of cephalexin are provided which are readily water soluble and are useful as antibiotics which may be administered parenterally.

---

This invention relates to N-carboxy derivatives of the antibiotics cephradine and cephalexin and hydrated forms thereof, having the following structure

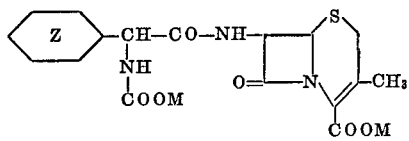

wherein

and M is either sodium or potassium. Thus, the invention encompasses compounds of the following structures (II)
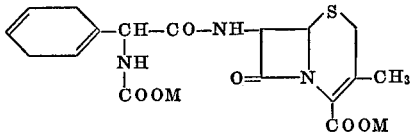

(III)
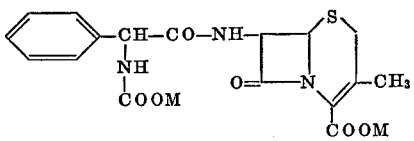

and hydrates thereof, wherein M in each compound is the same and may be sodium or potassium.

As employed herein, the term "cephradine" refers to α-amino - 2,5 - dihydrobenzyl-3-desacetoxycephalosporin, and the term "cephalexin" refers to α-aminobenzyl-3-desacetoxycephalosporin.

The N-carboxy compounds of the invention, as seen above, are disodium or dipotassium salts, which are formed by reacting cephradine or cephalexin with sodium carbonate or potassium carbonate in the presence of water, employing the reaction components in substantially equimolar amounts. Use of large excesses of the carbonates is undesirable, since contamination of the product with alkali bicarbonate might result. Formation of the N-carboxy derivatives can be demonstrated by electrophoresis of samples of the solutions, since the carbamate ions (B) from either cephradine or cephalexin have two negative charges in alkaline solutions and are easily separated from the acid anion (A):

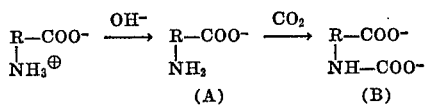

The N-carboxy compounds of the invention may be crystallized from the aqueous reaction mixtures by addition of selected water soluble solvents. Suitable solvents include lower ketones (e.g., acetone or methyl ethyl ketone) and ethers (e.g., tetrahydrofuran or dioxane). Acetone is especially preferred. Lower alcohols (e.g., methanol or ethanol) are less suitable for the purpose of the invention; however, they may be used to remove small amounts of alkali bicarbonates from the crude reaction mixtures before crystallization of the desired N-carboxy compounds.

The crystallized N-carboxy compounds may be separated from the reaction mixtures by conventional techniques, such as filtration, centrifugation and the like.

The entire reaction and isolation sequence may be performed at room temperature, but temperatures in the range from about 0° C. to about 50° C. are applicable as well. Temperatures outside this range may also be employed but are without apparent benefit.

The N-carboxy compounds of the invention provide the valuable antibiotics cephradine and cephalexin in easily water soluble form, suitable for reconstitution with water for purposes of injection. While cephradine and cephalexin are soluble in water only to about 2% and thus do not form aqueous solutions of acceptable potency for injection, the new N-carboxy compounds are extremely soluble in water and 20% solutions can be obtained without difficulty. The N-carboxy compounds, when dissolved in small amounts of water and administered by injection into the body fluids of warm blooded animals including man, are in equilibrium with the free antibiotics cephradine and cephalexin to an extent governed by the acidity of the body fluid and its carbonate concentration. Thus, the free antibiotics become available upon injection. The invention therefore provides a means for rapid administration of the desired biological activity by injection of aqueous solutions of the respective N-carboxy derivative.

In forming the injectable solution, sufficient sterile water is added to the solid N-carboxy derivative to provide a concentration of active antibiotic of about 50 to 500 milligrams per milliliter of water, preferably about 200 milligrams per milliliter of water.

The solid N-carboxy derivatives as well as the injectables formulated in accordance with the invention can be employed for the same utility as the parent antibiotics.

The following examples further illustrate and represent preferred embodiments of the invention.

EXAMPLE 1

Preparation of disodium N-carboxycephradine

Cephradine monohydrate (3.67 g., 10 mmole) is slurried with water (10 ml.) at room temperature. Anhydrous sodium carbonate (1.06 g. of 10 mmoles) is added in one portion. A clear solution is obtained which is polish filtered. The filtrate is agitated at room temperature and acetone is added slowly. Spontaneous crystallization occurs after about 2 ml. have been added. Another 25 ml. of acetone is added gradually. The crystal slurry is agitated at room temperature for 15 minutes. The mixture is filtered and the crystal cake is washed with 80% aqueous acetone (10 ml.) followed by acetone (10 ml.). The solid is dried under vacuum at room temperature for two hours. Disodium N-carboxycephradine (2.51 g., 45 mole-percent, corrected for purity) is obtained as a white solid.

The product contains some residual sodium bicarbonate shown by X-ray diffraction and IR spectrum. Analytical results are in agreement with the following composition: disodium N-carboxycephradine, 78.6%; water, 8.4%; sodium bicarbonate, 13.0%.

Calcd. (percent): C, 38.58; H, 4.18; N, 7.55; Na, 11.81; S. 5.76; $H_2O$, 8.4; N.E., 194.
Found (percent): , 38.19; H, 3.91; N, 7.60; Na, 11.57; S. 5.69; $H_2O$, 8.4; N.E., 193.

EXAMPLE 2

Preparation of disodium N-carboxycephalexin

Cephalexin monohydrate (1.82 g., 5 mmole) is slurried with water (5 ml.) at room temperature. Anhydrous sodium carbonate (0.53 g., 5 mmole) is added in one portion. A clear solution is formed. Methanol (30 ml.) is added to this solution until the turbidity of the mixture does not increase further. Insoluble matter is removed by centrifugation. The clear supernate is concentrated under vacuum at room temperature until most of the methanol is removed. The clear aqueous concentrate is now diluted with acetone while stirring at room temperature. Fine needles begin to separate after about 10 ml. of acetone have been added. Another 40 ml. of acetone is added gradually and the slurry is agitated for another half hour. The product is isolated by filtration, washing with 95% aqueous acetone (10 ml.) and air drying. Disodium N-carboxycephalexin (1.40 g., 55 mole-percent) is obtained as a white powder, containing about five molecules of hydrate water.

The product does not contain sodium bicarbonate according to the X-ray diffraction pattern. The microanalysis is calculated for a pentahydrate.

Calc'd. (percent): C, 38.86; H, 4.80; N, 8.00; Na, 8.75; S. 6.10; $H_2O$, 17.1.

Found (percent): C, 38.83; H, 3.55; N, 8.29; Na. 8.36; S. 5.96; $H_2O$, 18.9.

What is claimed is:
1. Compounds of the structure

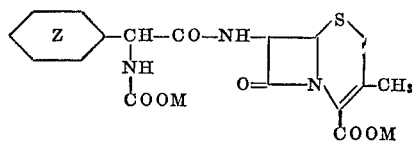

wherein

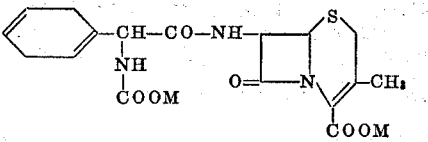

and M is sodium or potassium and hydrates thereof.

2. A compound in accordance with claim 1 having the structure

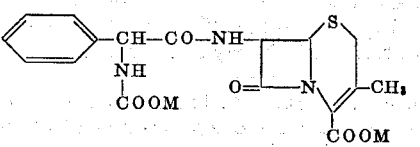

3. A compound in accordance with claim 1 having the structure

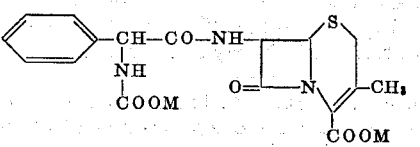

4. A method for preparing compounds as defined in claim 1 which comprises reacting cephradine or cephalexin with sodium or potassium carbonate in the presence of water.

References Cited

UNITED STATES PATENTS 3,502,663   3/1970   Barnes _____ 260—243 C

NICHOLAS S. RIZZO, Primary Examiner

U.S. Cl. X.R.

424—246